April 26, 1938.  A. B. RYPINSKI  2,115,429
ELECTRICAL INSTRUMENT BASE
Filed Nov. 24, 1936  2 Sheets-Sheet 1
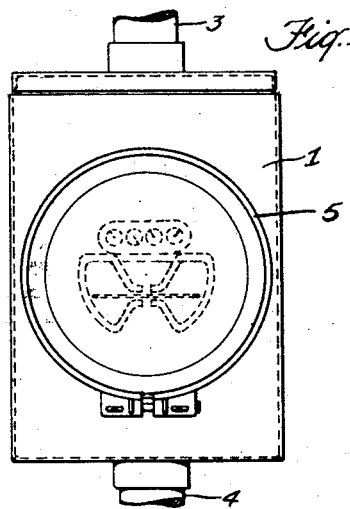
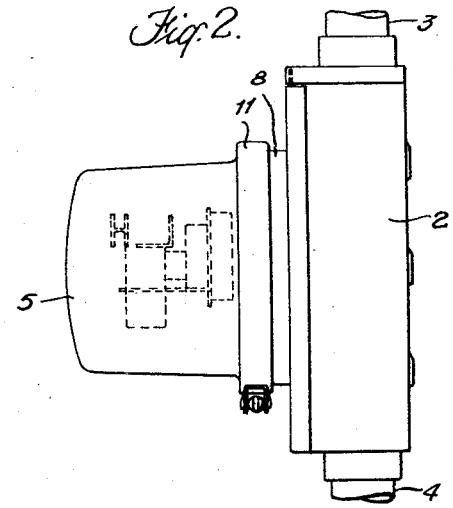
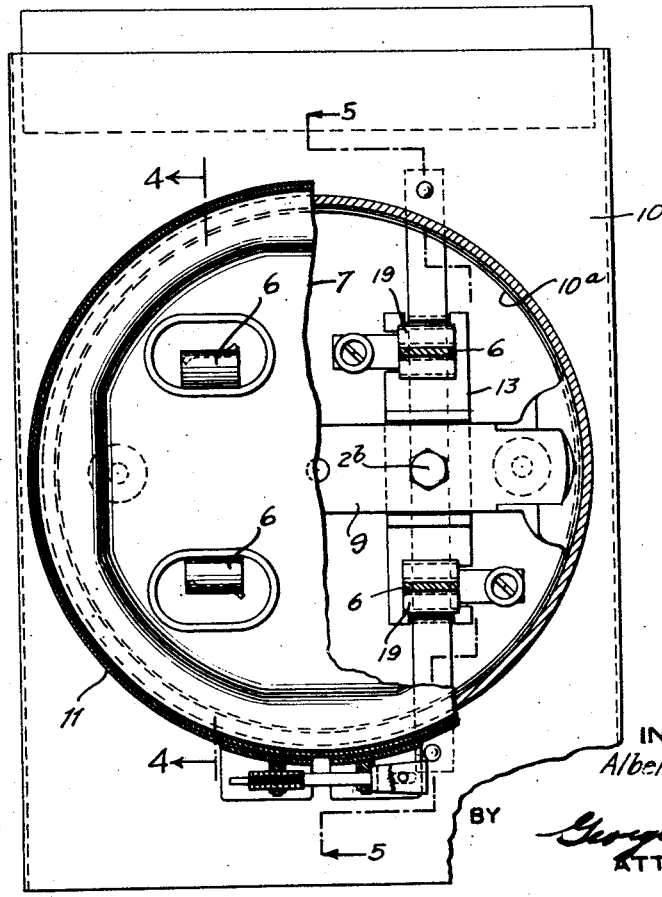
INVENTOR
Albert B. Rypinski
BY
George F. Gill
ATTORNEY April 26, 1938.  A. B. RYPINSKI  2,115,429
ELECTRICAL INSTRUMENT BASE
Filed Nov. 24, 1936  2 Sheets-Sheet 2
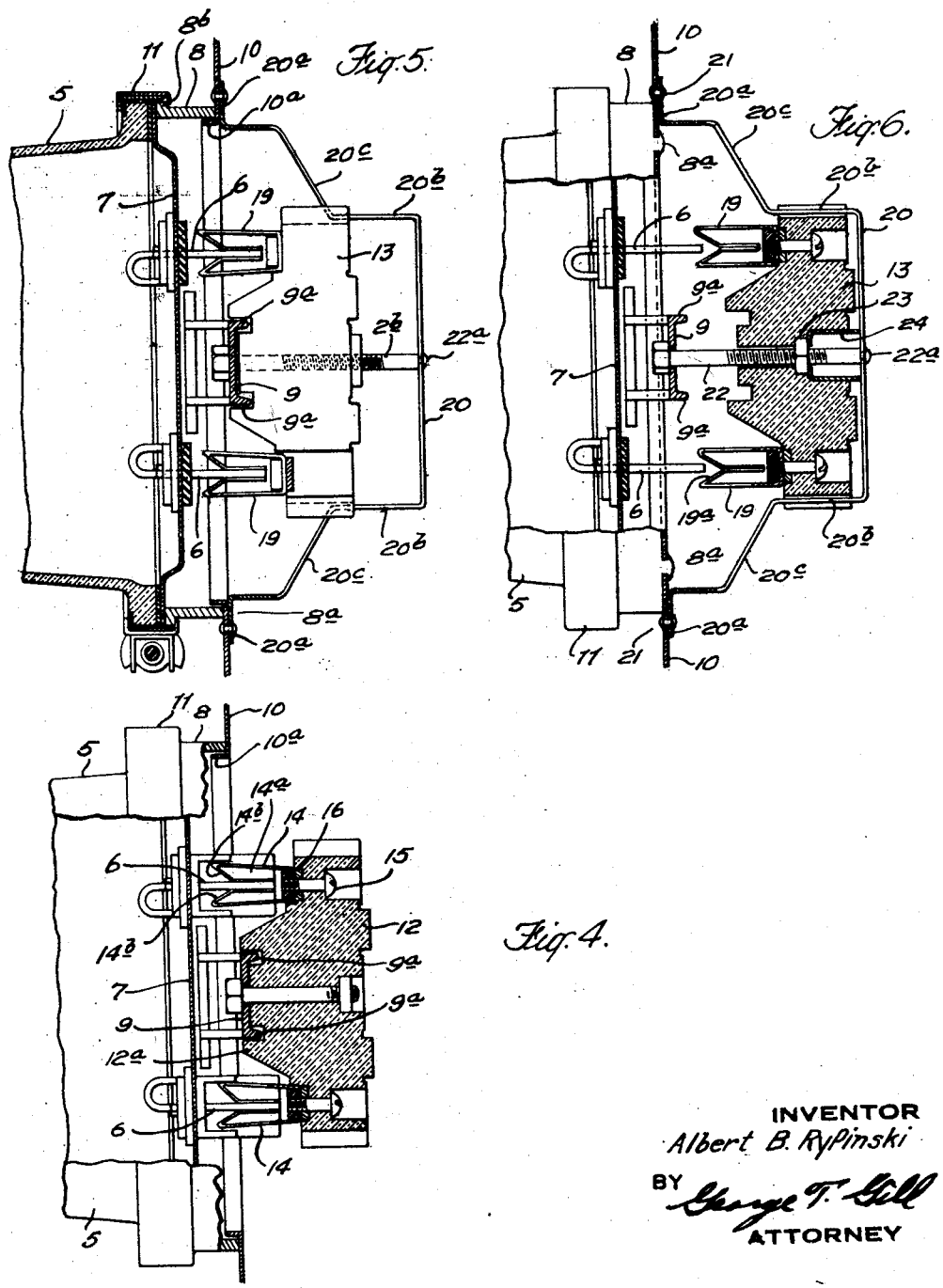
INVENTOR
Albert B. Rypinski
BY
ATTORNEY Patented Apr. 26, 1938

2,115,429

UNITED STATES PATENT OFFICE 2,115,429

ELECTRICAL INSTRUMENT BASE

Albert B. Rypinski, Laurelton, N. Y., assignor to Metropolitan Device Corporation, a corporation of New York Application November 24, 1936, Serial No. 112,496

6 Claims. (Cl. 247—2)

The invention herein disclosed relates to an electrical instrument base and in particular to a base for an electrical instrument of the socket type, that is, an instrument having contact blades positioned to engage blade-engaging contacts secured in the base upon which the instrument is mounted.

Instruments of this type carry contact blades extending perpendicular to the rear wall thereof. A base for such an instrument carries blade-engaging contacts that are connected into the electric circuit into which the instrument is to be connected. When the instrument is placed on the base, the blades extending from the instrument are engaged by the blade-engaging contacts in the base and the instrument is thus electrically connected into the circuit. In practice, it is often desirable to disconnect the instrument from the circuit and leave the instrument on the base. Various expedients have been heretofore devised to effect this purpose with the socket type of instrument but none has proven to be entirely satisfactory and it is an object of this invention to provide a base for instruments of this type so constructed that the instrument may be electrically disconnected even though it is mounted on the base.

In accordance with the invention, there is provided a base for electrical instruments of the socket type in which a blade-engaging contact is movably mounted in the base. The movably mounted blade-engaging contact may be moved from a position in which it engages a blade of an instrument mounted on the base to a position in which it is spaced from the blade of the instrument mounted on the base. In the latter position of the blade-engaging contact, the instrument is electrically disconnected.

Such an instrument base is illustrated in the accompanying drawings in which:

Fig. 1 is a front elevation of the instrument base with an instrument mounted thereon;

Fig. 2 is a side elevation of the same;

Fig. 3 is a front elevation thereof with a part of the instrument shown in section and a part broken away;

Fig. 4 is a transverse section taken along the line 4—4 of Fig. 3;

Fig. 5 is a transverse section taken along the line 5—5 of Fig. 4; and

Fig. 6 is a transverse section similar to Fig. 5.

The instrument base, denoted generally by the numeral 1, is mounted on a box 2, that may be considered as part of the base. The box 2 is a sheet metal box connected in to an electrical conduit system represented by the conduits 3 and 4 and contains the usual contact blocks. Commonly, the box 2 is mounted upon a wall and the meter 5, illustrated as a watt hour meter, extends horizontally as shown. Such an instrument may have four or more contact blades, the instrument shown having four blades 6 extending perpendicularly from the rear wall 7 thereof. When mounted on the base 1 these blades are received by blade-engaging contacts, one for each blade, mounted in the base and the instrument is thus electrically connected into the circuit that includes the blade-engaging contacts.

The base 1 includes a die-cast, cylindrical frame or collar 8 of relatively narrow width having an integral, diametrical blade-engaging contact support 9. The frame is mounted upon a sheet metal cover 10 which has a circular opening therethrough defined by a lateral flange 10a that is received in the frame 8. The frame is secured to the cover 10 by means of a series of integral, spaced deformable lugs 8a that extend from one edge of the frame and through openings provided therefor in the cover. These lugs are beaded over and in effect form rivets securing the frame to the cover. The free end of the frame is provided with a radial, circumferential flange 8b against which the meter 5 abuts and to which the meter is secured by a removable ring 11 of channel-shape in cross-section, in a manner well known to those skilled in the art.

The contact support 9 is channel-shape in cross-section, the flanges 9a extending inwardly of the base. Two relatively narrow contact blocks 12 and 13 of insulating material are mounted on the support transversely thereof. The contact blocks are spaced apart, one on each side of the longitudinal center of the support 9, and positioned so that blade-engaging contacts carried thereby are in line with corresponding blades on the meter 5. The contact block has a central, extended section 12a that engages the support 9 and it is provided with a pair of parallel grooves in which the flanges 9a of the support are received. On each side of this central, extended section 12a there is formed a shoulder on which a blade-engaging contact 14 is mounted. The several blade-engaging contacts are identical and each consists of a strip of electrically conductive metal bent in the form of a U with the legs thereof reversely bent to form opposed blade-engaging jaws such as the jaws 14a of the contact 14 which also have diverging end sections 14b. The base of the U-shaped strip is secured to the contact block by a bolt

15 that extends through the block and in threaded engagement with a nut 16 within the U-shaped strip, the base of the U being clamped between the nut 16 and the shoulder on the contact block on which the contact is mounted. The contact block is secured to the contact support 9 by a bolt 17 which extends through an opening in the support 9 and an opening through the block. A nut 18 received in a recess in the block and engaging the bolt secures the block to the support. The flanges 9a of the support 9 engaging the sides of the recesses in the extended section 12a of the contact block prevent rotative movement of the contact block.

The contact block 13 is similar in construction to the contact block 12 and carries a pair of blade-engaging contacts 19 similar to the blade-engaging contacts 14. The contact block 13 is, however, mounted so as to be movable relative to the support 9. For this purpose there is provided a substantially U-shaped bracket 20 that extends transversely of the support 9 and in the plane of the contact block 13. The bracket 20 has flanges 20a on the legs thereof that are secured to the cover 10 by rivets 21 and thus to the frame. Each of the legs of the bracket 20 has a section 20b that is perpendicular to the plane of the cover 10 and a diverging section 20c. The sections 20b are received in grooves formed on the edges of the contact block 13 and form guides along which the contact block moves.

The contact block 13 is movable from a position, shown in Fig. 5, in which it is firmly secured against the support 9, to a position spaced from the support and against the base of the U-shape bracket 20, as shown in Fig. 6. The contact block 13 is secured between the bracket 20 and the support 9 by a bolt 22 that extends through the support 9 and through the block. The end of the bolt 22 is reduced in cross-section and the reduced end extends through an opening in the base of the U-shaped bracket 20. A head 22a is formed on the reduced end of the bolt and the head and the shoulder formed by reducing the end of the bolt engage opposite sides of the base of the bracket and secure the bolt against longitudinal or axial movement relative to the support 9 and bracket 20 while permitting relative rotational movement of the bolt. Within a recess in the block 13 there is mounted a nut 23 that is in threaded engagement with the bolt 22. The nut is secured against rotational movement relative to the contact block by the shape of the recess and it is secured in the recess by a flanged bushing 24 that is forced in the recess behind the nut. The block 13 is secured against rotational movement by the sections 20b of the legs of the bracket. It will thus be apparent that when the bolt 22 is rotated in one direction the block 13 will be moved toward, and caused to abut against, the support 9, and when rotated in the opposite direction, the block will be moved away from the support 9 and against the base of the U-shaped bracket 20.

When the block 13 is in the position illustrated in Fig. 5, that is, against the support 9, the blade-engaging contacts 19 are so positioned that they engage the corresponding blades on the meter 5. When the block 13 is moved to a position against the bracket 20, as illustrated in Fig. 6, the blade-engaging contacts 19 are spaced from the corresponding blades on the meter and the meter is electrically disconnected. In the case of a watt hour meter, the electrical circuit is of course broken at the meter when the meter is thus electrically disconnected. If, therefore, in the use of a watt hour meter, the service company desires to disconnect its service, but does not desire to take away the meter, it is only necessary to remove the meter from the base, rotate the bolt 22 until the block 13 abuts against the bracket 20 and then replace the meter. When it becomes necessary to resume service, the meter is removed from the base, the bolt rotated until the block 13 abuts against the support 9 and the meter replaced.

While the invention has been illustrated and described in connection with a single meter base, it will be obvious that it is equally applicable to a multiple meter base and to electrical instruments of the socket type other than watt hour meters; it will also be obvious that various changes may be made by those skilled in the art in the details of the embodiment illustrated in the drawings and described above within the principle and scope of the invention as expressed in the appended claims.

I claim:

1. An electrical instrument base for an instrument having fixed contact blades extending perpendicular to a side thereof and adapted to engage blade-engaging contacts in a base, which instrument base comprises a contact support, a block of insulating material mounted on said support and movable with respect thereto, a blade-engaging contact carried by said block of insulating material, and means for moving said block of insulating material relative to the support.

2. An electrical instrument base for an instrument having fixed contact blades extending perpendicular to one side thereof and adapted to engage blade-engaging contacts in a base, which instrument base comprises a contact support, a block of insulating material mounted on said support and movable with respect thereto, a blade-engaging contact carried by said block of insulating material, a bracket secured to said support and embracing said block of insulating material, and means for moving said block of insulating material between the support and said bracket.

3. An electrical instrument base for an instrument having contact blades adapted to engage blade-engaging contacts in a base, which instrument base comprises a circular frame having a diametrical blade-engaging contact support, a block of insulating material carried by said blade support and extending transversely thereof, a pair of blade-engaging contacts carried by said block of insulating material, one on each side of the support, a bracket secured to said support and extending behind said block of insulating material, and means for moving the block of insulating material between said support and said bracket.

4. An electrical instrument base for an instrument having contact blades adapted to engage blade-engaging contacts in a base, which instrument base comprises a circular frame having a diametrical blade-engaging contact support, a block of insulating material carried by said blade support and extending transversely thereof, a pair of blade-engaging contacts carried by said block of insulating material, one on each side of the support, a bracket secured to said support and extending behind said block of insulating material, and means for moving the block of insulating material between said support and said bracket including a bolt journaled in said support and said bracket and extending through the block of insulating material, and a nut mounted in the block of insulating material in threaded engagement with the bolt.

5. An electrical instrument base for an instrument having contact blades adapted to engage blade-engaging contacts in a base, which instrument base comprises a circular frame having a diametrical blade-engaging contact support, a block of insulating material carried by said blade support and extending transversely thereof, a pair of blade-engaging contacts carried by said block of insulating material, one on each side of the support, a U-shaped bracket secured to said frame and extending transversely of the support in the plane of said block of insulating material, and means for moving the block of insulating material between the support and the bracket including a bolt journaled in the support and the bracket and extending through the block of insulating material and a nut carried by the block of insulating material and in threaded engagement with the bolt.

6. An electrical instrument base for an instrument having fixed contact blades extending perpendicular to a side thereof adapted to engage blade-engaging contacts in the base, which instrument base comprises a circular frame, a blade-engaging contact support, a block of insulating material carried by said support, a blade-engaging contact carried by said block of insulating material, and means for moving said block of insulating material from a position in which the contact on the block engages a blade of an instrument mounted on the base to a position in which the contact on the block is spaced from the blade of an instrument mounted on the base.

ALBERT B. RYPINSKI.